Oct. 4, 1966                H. T. SEELEY                3,277,343
                FAULT RESPONSIVE PROTECTIVE SYSTEM FOR
Filed Feb. 6, 1963    AN ELECTRIC POWER TRANSMISSION LINE
                                              4 Sheets-Sheet 2

INVENTOR:
HAROLD T. SEELEY,
BY Albert S. Richardson Jr.
    ATTORNEY.

INVENTOR:
HAROLD T. SEELEY,
BY Albert S. Richardson Jr.
ATTORNEY.

INVENTOR:
HAROLD T. SEELEY,
BY Albert S. Richardson Jr.
ATTORNEY.

United States Patent Office 3,277,343
Patented Oct. 4, 1966

3,277,343
FAULT RESPONSIVE PROTECTIVE SYSTEM FOR AN ELECTRIC POWER TRANSMISSION LINE
Harold T. Seeley, Lansdowne, Pa., assignor to General Electric Company, a corporation of New York
Filed Feb. 6, 1963, Ser. No. 256,622
9 Claims. (Cl. 317—29)

This invention relates to a phase fault responsive protective system for an electric power transmission line, and more particularly it relates to a high-speed directional-comparison pilot type transmission line protective relaying system adapted to employ "static" circuit components.

Fast operation, maximum reliability and security, low burden, and minimum maintenance are well known objectives of protective relaying designers. In furtherance of these interrelated goals, a good deal of attention is currently being given to the application of semi-conductor technology in the art of protective relaying. The present invention is related to this effort. It is a general objective of my invention to provide an improved directional-comparison protective system in which transistors and other semiconductor or "static" devices can be used to advantage. But while the distinctive characteristics and attributes of such static devices are contemplated in the preferred embodiment of my system, it will be apparent hereinafter that the invention is not limited to the exclusive use of these particular components.

A more specific objective of the present invention is to provide a high-voltage transmission line directional-comparison protective relaying system utilizing phase-fault responsive distance relays, the system being capable of fully secure yet even faster operation than the prior art system disclosed and claimed in United States Patent No. 2,879,454 granted on Mar. 24, 1959 to M. E. Hodges et al.

The function of any fault responsive directional-comparison protective relaying system is to initiate the simultaneous opening or tripping of high-speed circuit interrupters, which are located at the respective ends or terminals of an electric power line being protected by the relaying system, in quick response to a fault or short circuit occurring on the protected line. Of course, this operation should not take place in the event of an "external" fault, i.e. one occurring at some point in the power system beyond a terminal of the protected line. The intended function is accomplished by providing, at each terminal of the line, appropriate fault detecting and directional sensing means arranged to operate upon the occurrence of a line fault that appears to be internal, by comparing the operative state of said means at the respective terminals, and by initiating tripping only if this comparison reveals that the fault appears internal as viewed from every one of said terminals.

In order to make this directional comparison, it is necessary to interconnect the different terminals of the protected line by means of a pilot channel which can communicate appropriate intelligence therebetween. A variety of methods of obtaining the desired intercommunication are known, including in high-voltage transmission line relaying practice the use of carrier current or microwave transmission wherein a high-frequency continuous signal transmitted at each line terminal is almost instantly received at all other terminals. This signal is utilized to prevent or block tripping of the circuit interrupter located at each receiving terminal. The intended protective function may then be accomplished by arranging the relaying system to operate specifically as follows: Upon the incidence of a fault, signal transmission is immediately started at every terminal whose fault detecting means responds thereto, without regard to whether the fault is external or internal; subsequently this transmission is stopped at each terminal whose directional sensing means responds because the fault is located on the protected-line side of that terminal; the directional sensing means additionally attempts to trip the local circuit interrupter under like conditions; but tripping is blocked unless signal transmission stops at every terminal, indicating agreement by all of the directional sensing means that the fault is in fact internal.

In order to avoid improper operation of such a directional-comparison relaying system upon the occurrence of any external fault, it is imperative that the communicative signal when transmitted from one terminal of the protected line actually be received at every remote terminal and be there effective to block tripping before an attempt-to-trip operation by the directional sensing means at that remote terminal can be effected. This requires time coordination in the operations of the fault detecting means, which sets up blocking at the remote terminal by starting signal transmission locally, and the directional sensing means which attempts tripping at the remote terminal. Accordingly, a further object of the present invention is the provision, in a fast operating and secure directional-comparison relaying system for protecting an electric power transmission line, of improved means for obtaining reliable, high-speed time coordination between relay components at opposite terminals of the line under even the most severe adverse conditions in the electric power system.

It is another object of my invention to provide high-speed coordination between opposite terminals of a protective relaying system which utilizes directional sensing relays having sawtoothed operating-time v. angle-of-fault-incidence characteristics.

Still another object of the invention is the provision of an adequately coordinated high-speed directional-comparison protective system in which the pyramiding of time margins is minimized.

Another object of this invention is to provide a reliable and secure protective relaying arrangement of the character described, wherein unusually high-speed time coordination is obtained.

In carrying out my invention in one form, I provide a directional-comparison protective relaying system for initiating a predetermined control function, such as tripping circuit interrupters, in high-speed response to the occurrence of a phase fault on a section of a polyphase A.C. electric power transmission system. The protected section is isolated by the circuit interrupters which are located at distantly spaced terminals of a transmission line, and each terminal is equipped with a signal transmitter and receiver. These signal transmitters and receivers are so arranged that the transmitter at each terminal can communicate when active with the receiver at any other line terminal remote therefrom.

My protective system comprises at each of the line terminals an arrangement of cooperating relay components of a kind known in the art as distance relays. A first one of these distance relays is arranged to activate the local transmitter when in operation, thereby causing transmission of a communicative signal which, upon receipt by the receiver at any remote terminal, effects a blocking function there. The blocking function disables control means which I provide at each terminal to initiate the desired control function in response to the contemporaneous occurrence of two events. One of these two events is the operation of suitable directional sensing means (preferably a distance relay having a "mho" operating characteristic), which operation takes place only in response to the incidence of a fault in the electric power system on the protected-section side of the local terminal. The second event is the operation of an additional or second distance relay of the same construction as the aforesaid first distance relay. I also provide means for deactivating the local transmitter, thereby discontinuing the transmission of the communicative signal locally, upon the concurrence of these two events. It is apparent, therefore, that the predetermined control function can be effected only when the directional sensing means and the second distance relay are both in operation at all terminals of the protected section of the electric power transmission system.

At each terminal the aforesaid first and second distance relays are each arranged to operate whenever the relationship between predetermined electric quantities indicates that a power system fault has occurred on or near the protected section thereof, with the former relay having the greater reach and its operation being effected in advance of operation by the latter. The predetermined electric quantities which I supply to each of these relays are derived from power system current and voltage at the local terminal by suitable means provided for this purpose. In accordance with my invention, the last-mentioned means are so arranged that the voltage-derived quantities supplied to the first and second distance relays are actually representative of system voltage at the local terminal vectorially combined with compensating voltages related to system current by predetermined first and second constant impedances, respectively. In the preferred embodiment of the invention the aforesaid first and second impedance are one and the same, and in all cases the predetermined first impedance at the local terminal and the predetermined second impedance at a remote terminal are so selected and interrelated that their vector sum is approximately equal to the impedance of the protected section of the power system extending between these particular terminals. With this arrangement, under all load and external fault conditions, the same relaying quantities are being supplied to the first distance relay and to the second distance relay located, respectively, at opposite terminals of the protected section, and the desired time coordination between opposite terminals is assured. At the same time, high-speed response by the protective system under internal fault conditions is preserved, since deactivation of the local transmitter and initiation of the predetermined control function are delayed after operation of the directional sensing means only if and to the extent that the directional sensing means operates earlier than the second distance relay which is associated with it.

My invention will be better understood and its various objects and advantages will be more fully appreciated from the following description taken in conjunction with the accompanying drawings in which.

FIGURES 1 AND 2

Figure 1:
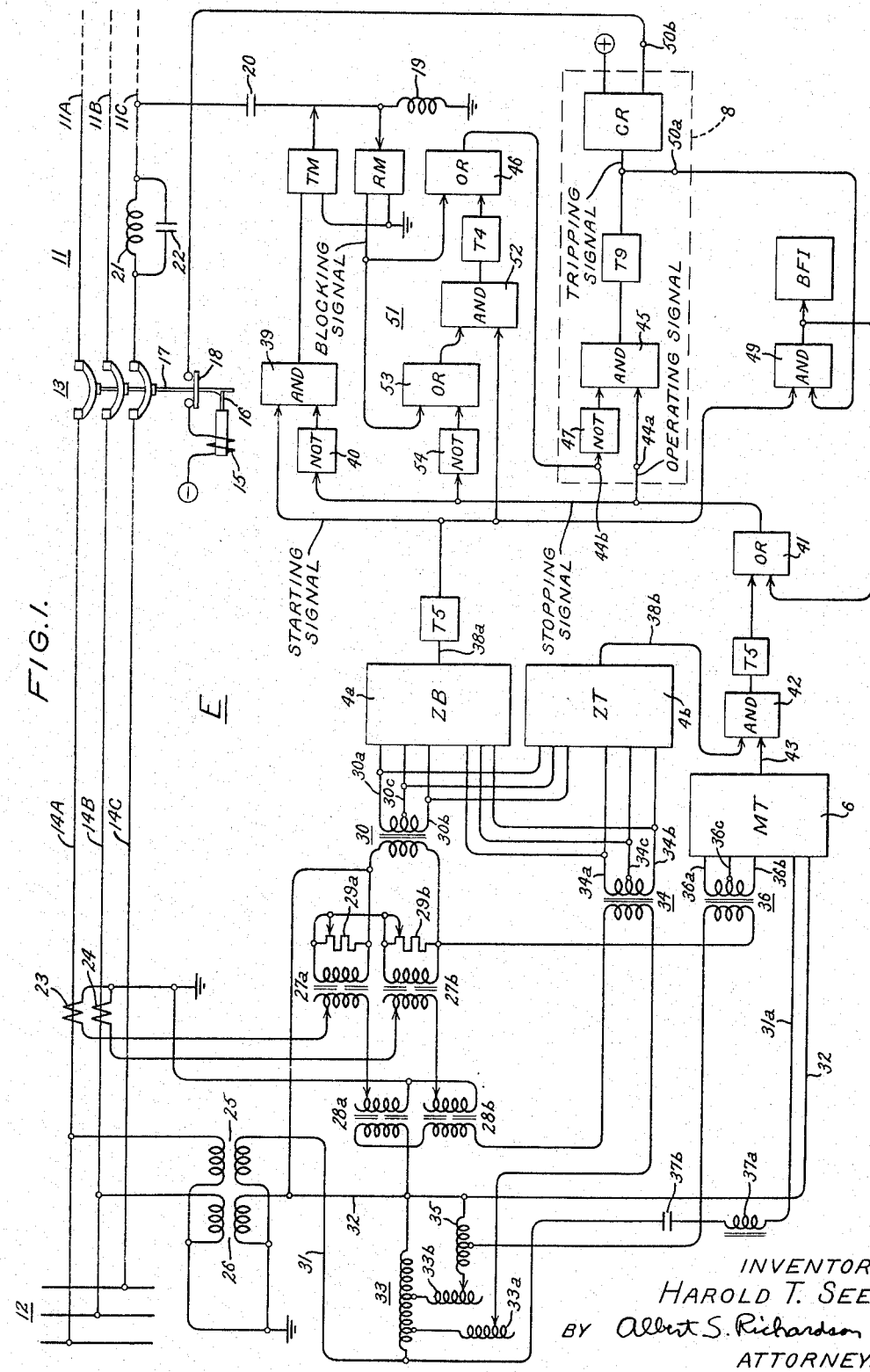
FIG. 1 is a schematic circuit diagram, partly in block form, of a phase fault responsive directional-comparison protective relaying system embodying my invention, this diagram showing system components at only one of at least two similar, distantly spaced terminals of an electric power transmission line being protected by my relaying system.

Referring now to FIG. 1, I have shown schematically and in block form, for the purpose of illustrating a preferred embodiment of my invention, one terminal of a phase fault directional-comparison protective relaying system for a 3-phase alternating-current electric power transmission line 11 comprising conductors 11A, 11B and 11C. These phase conductors represent a section of a high-voltage electric power system which is used for conducting alternating current of power frequency, such as 60 cycles per second, between distantly spaced terminals of the protected line 11. In order to avoid compounded drawing details that are unnecessary for a full and clear understanding of my invention, there has been set forth in FIG. 1 equipment and relaying components at only one line terminal, identified generally by the reference letter E, and it should be understood that everything therein associated with this particular terminal is duplicated at each tine terminal remote therefrom (excepting only the relative polarities of the coupling between the relaying system and the electric power line which, at any remote terminal, will be the mirror image of the polarity shown at terminal E, and the selection of the transactors 28a and 28b whose transfer impedances may be different at opposite terminals according to the teachings contained hereinafter).

As is indicated in FIG. 1, the transmission line 11 is connected at its terminal E to a power source (or load) bus 12 by way of a 3-pole circuit interrupter 13 and three conductors 14A, 14B and 14C of relatively short lengths. The local components of the protective relaying system are appropriately coupled to these short phase conductors. It is the function of the relaying system to initiate opening of the circuit interrupter 13 in high-speed response, and substantially simultaneously with like action at each remote terminal of the protected line, to the occurrence of an internal phase fault, i.e., upon the occurrence of a short circuit between two or more of the phase conductors at any point along the protected line 11. Under such conditions the relaying system is so arranged as to connect a trip coil 15 of the circuit interrupter 13 to a dependable source of energy, such as a station battery which is represented in FIG. 1 by the encircled plus and minus symbols, and when thus energized the trip coil 15 actuates a latch 16 thereby releasing switch member 17 of the circuit interrupter for rapid circuit opening movement. A "normally open" auxiliary contact 18 of the circuit interrupter is connected in series with the trip coil 15 to deenergize the same during the circuit opening operation.

The necessary intercommunication between duplicate relaying equipments at the respective line terminals is accomplished in the illustrated embodiment of the invention by utilizing conductor 11C as a pilot channel for the transmission of high-frequency carrier current. Each terminal is equipped with transmitting means TM for generating, upon activation of the transmitter in response to a suitable control signal, a continuous carrier-current communicative signal of high frequency (such as 100,000 cycles per second). An inductance element 19, as can be seen in FIG. 1, is connected between ground and a coupling capacitor 20 which in turn is connected to the phase conductor 11C, and a connection is made from the output of transmitter TM to the junction of elements 19 and 20. The capacitor 20 is designed with sufficient insulation to withstand line voltage, and it easily passes high-frequency carrier current while presenting a high impedance to the transmission line current of power frequency. At each end of the transmission line 11 a parallel resonant circuit comprising an inductance 21 and a capacitor 22 tuned to the carrier-current frequency is connected in series circuit relationship with conductor 11C to provide a wave trap which confines the carrier current to the protected line without introducing any appreciable impedance to current of power frequency flowing through this conductor.

The high-frequency communicative signal generated by the transmitter TM when activated will cause carrier current to flow in a loop comprising transmitter TM, coupling capacitor 20, conductor 11C, the corresponding coupling capacitor and a receiver at a remote terminal, and a ground return path. As is indicated in FIG. 1, each line terminal is equipped with receiving means RM which is similarly connected to the junction of coupling capacitor 20 and inductance element 19. The receiver RM is tuned to the frequency of the carrier current transmitted by transmitting means at a remote terminal, and hence it is operably energized by the communicative signal received from the remote terminal. In practice, the carrier-current transmitters TM located at the respective line terminals are usually arranged to oscillate at a common frequency, whereby the local receiver RM actively responds to the communicative signal originating from the companion transmitter as well as that received from the distant or remote transmitter. Since the relaying system utilizes carrier current for blocking purposes only (to prevent relay operation in the event of an external fault), proper operation of the system will be obtained in case of an internal fault even if carrier current were discontinued due to a failure of the pilot channel 11C itself (indicating an internal fault).

Although a carrier-current form of communication signal has been shown and described in the preferred embodiment of my invention, those skilled in the art will recognize that other known methods of intercommunication could alternatively be employed. For example, a microwave pilot channel is appropriate for this purpose, in which case it is common practice to arrange the signal transmitters TM at the respective line terminals to operate at different frequencies. The relaying system will function successfully in such a setting. The system is also well suited for protecting transmission lines having either two or three terminals, and wherever for convenience I herein refer in the singular to a line terminal remote from the local terminal E, it is not my intention to limit the system's application to only a 2-terminal line.

In order to detect the occurrence of a phase fault in the electric power system and to sense its direction, the components of the protective relaying system at the local terminal E are coupled to the transmission line by a pair of Y-connected instrument current transformers 23 and 24 associated, respectively, with conductors 14A and 14B, and a pair of Y-connected instrument potential transformers 25 and 26 which are coupled respectively to the same two conductors. The secondary currents of the current transformers 23 and 24 are therefore representative of transmission line current flowing locally in phase conductors 11A and 11B, respectively, while the voltage derived across the secondary windings of the potential transformers 25 and 26 is proportional to the line-to-line voltage between these two conductors at terminal E. The individual relays ZB, ZT and MT connected to these transformers in the manner shown in FIG. 1 are arranged to operate in response to certain critical relationships between these representative quantities arising upon the occurrence of any fault which involves both of the phase conductors 11A and 11B of the protected transmission line. Complete response to phase-to-phase faults involving conductors 11B and 11C or conductors 11C and 11A is obtained in practice by providing additional current and potential transformers coupled to the conductor 14C and by providing two more duplicate sets of relays similarly connected thereto.

As can be seen in FIG. 1, the secondary circuit of current transformer 23 includes the primary windings of two "transactors" 27a and 28a, while the secondary circuit of current transformer 24 includes the primary windings of two companion transactors 27b and 28b. A transactor is a known device having electrical characteristics similar in some respects to a conventional transformer and similar in other respects to a reactor. In effect, it is an airgap reactor having associated therewith primary and secondary windings, with a load circuit being connected to the secondary winding.

The voltage developed across the secondary winding of each transactor is accurately representative, both in magnitude and phase, of the net primary current energizing it. Secondary voltage is related to primary current by a complex proportionality constant or vector operator known as the transfer impedance of the transactor. The transfer impedance, and hence the absolute magnitude of the secondary voltage and the specific angle by which this voltage leads the net primary current, can be controlled by varying the amount of load in the secondary circuit. The dimensions of the air gap in the transactor core and the selection of its turns ratio also affect the magnitude of the secondary voltage relative to the primary current. Open circuit secondary voltage leads primary current by nearly 90 electrical degrees, and as the resistance load across the secondary is increased, the angle of lead becomes less. Although not shown in FIG. 1, suitable surge suppressing means can be provided in the secondary circuit of each transactor.

As can be seen in FIG. 1, the secondary windings of the transactors 27a and 27b, shunted by rheostats 29a and 29b respectively, are interconnected in polarity opposing series relationship across an isolating transformer 30. Opposite ends or terminals of the secondary winding of the transformer 30 are connected to leads 30a and 30b, respectively, and a tap midway between the ends of this winding is connected to a lead 30c. With this arrangement a voltage proportional to the vector difference between the transmission line currents flowing in conductors 11A and 11B at the local terminal E is developed across each half of the secondary winding of transformer 30. The leads 30a, 30b and 30c supply this voltage to a relay component 4a shown in FIG. 1 as a block labeled "ZB," and this voltage comprises an A.C. operating quantity for the ZB component.

The secondary windings of the Y-connected potential transformers 25 and 26 are connected between ground and wires 31 and 32, respectively. As can be seen in FIG. 1, an autotransformer 33 is connected between the wires 31 and 32. The autotransformer has two extended windings 33a and 33b shown schematically in the drawing, and these extended windings are conductively connected to two different coarse taps of the main winding of the autotransformer. The main and both extended windings are actually all wound on a single magnetizable core (not shown). Each of the extended windings 33a and 33b has a vernier tap, and the voltages between these taps and wire 32 will be seen to be representative of the line-to-line voltage across conductors 14A and 14B of the electric power system.

The portion of the autotransformer 33 tapped from its extended winding 33a, in series with the secondary windings of the transactors 28a and 28b, which windings are interconnected in polarity opposing relationship with each other, is connected across an isolating transformer 34. Opposite ends or terminals of the secondary winding of transformer 34 are connected to leads 34a and 34b, respectively, and a tap midway between the ends of this winding is connected to a lead 34c. With this arrangement a voltage is developed across each half of the secondary winding of transformer 34 that is proportional to the vectorial combination of line voltage and a voltage representative of the vector difference between line currents flowing locally in conductors 11A and 11B, the latter voltage being related to line current by a complex proportionality constant which is dependent on the transfer impedance of the transactors 28a and 28b. This latter voltage will hereinafter be referred to as the "compensating" voltage, and its purpose, as well as the criteria for selecting the aforesaid transfer impedance, will soon be explained in detail. The leads 34a, 34b and 34c supply the secondary voltage of transformer 34 to the ZB component, and this voltage comprises an A.C. restraining quantity for the ZB component.

The portion of the autotransformer 33 that is tapped from its extended winding 33b has connected thereacross another autotransformer 35 which is midtapped as indicated in FIG. 1. The tapped portion of the autotransformer 35 is connected in series with the interconnected secondary windings of transactors 27a and 27b across an isolating transformer 36. Leads 36a and 36b are connected to opposite ends or terminals of the secondary winding of transformer 36, and a lead 36c is connected to a midtap of this winding. With this arrangement the voltage developed across each half of the secondary winding of transformer 36 is proportional to line voltage V vectorially combined with a voltage representative of the vector difference between the aforesaid line currents, the latter voltage being related to line current I by a complex proportionality constant $\overline{Z}$ which is dependent on the transfer impedance of transactors 27a and 27b. The leads 36a, 36b and 36c supply the secondary voltage of transformer 36 to a relay component 6 shown in FIG. 1 as a block labeled "MT," and this voltage comprises an A.C. operating quantity for the MT component. The MT component is also supplied with an A.C. reference quantity comprising the potential transformer secondary voltage taken across wires 31 and 32, with wire 31 being connected to this component through a series LC memory circuit, comprising inductance and capacitance elements 37a and 37b, and a lead 31a.

The ZB component (4a) of the relaying system is intended to detect the occurrence of a phase fault in the electric power system on or near the protected line 11 by operating in high-speed response to the relationship between line voltage and current values which exist in conductors 11A and 11B at the local terminal E under such conditions. This component, to be described in detail hereinafter, is the kind of fault responsive means known in the art as a distance relay. It is a function of distance relay ZB when in operation to activate the signal transmitter TM thereby starting the transmission of carrier current from the local terminal E.

The MT component (6) of the relaying system is intended to sense the direction in which the above-mentioned phase fault is located, with respect to the local terminal, by operating in high-speed response to a characteristic relationship between line voltage and current which exists at the local terminal E only when the fault is located on the protected-line side thereof. Hence a phase fault between conductors 11A and 11B of the protected line 11 (or in the power system connected to these conductors for a certain distance beyond the remote terminal of the line) will cause MT to operate, while a phase fault on the adjoining bus 12 (or nearby on other transmission lines connected to this common bus) will not. MT when operating performs two functions (both requiring the contemporaneous operation of relay ZT, as will be explained hereinafter): it immediately deactivates the associated transmitting means TM, thereby stopping the transmission of carrier current from the local terminal; and after a short delay it attempts to open or trip the circuit interrupter 13. This attempt to trip is blocked so long as the local receiving means RM is receiving carrier current from an active transmitter located at any other terminal of the line. Thus the relaying system will initiate tripping of the circuit interrupters at the respective terminals of the protected line only if the directional sensing means MT is operating at every terminal whose fault responsive relay ZB has operated, which state indicates that the fault has occurred in fact on the protected line.

In FIG. 1, I show schematically the control means and circuitry by which the relaying components ZB, MT (and ZT), and the receiving means RM are able to carry out the various functions that have been assigned to them. The diagram includes a number of symbolically illustrated "logic units," and an explanation of the symbols employed will now be offered. Each block labeled "OR" represents a circuit or unit which is in an operative state (its output is "on") whenever either (or both) of two alternative inputs is "on." Each "AND" block represents a circuit or unit whose output signal is "on" only when all of the identified inputs are concurrently on. The output of a "NOT" block is "on" only when its input signal is "off," and therefore, when used in conjunction with either the OR or the AND unit, it enables the operation of that unit to be controlled in accordance with the absence rather than the presence of its input.

The general operation of the protective relaying system shown at the transmission line terminal E in FIG. 1 can now be readily followed. As previously stated, it is desired to open the circuit interrupter 13 in high-speed response to the occurrence of an internal phase fault, which condition is indicated by the operation of the directional sensing means MT and the inoperation of the carrier-current receiving means RM (because no carrier-current is being transmitted from any remote terminal of the protected line). As a corollary, it is desired to prevent tripping under all external phase fault conditions, as indicated by either the absence of MT operation or the presence of received carrier-current by RM.

In order to accomplish both of these objectives, the relaying system is so arranged that upon the occurrence of any phase fault detected by the fault responsive distance relay ZB, regardless of the particular location of the fault, this fast operating relay will energize a pulse stretching component T5 to which it is connected by a lead 38a. The pulse stretching component T5 responds by substantially instantaneously developing a continuous "starting" signal, and this starting signal is supplied to an AND logic unit 39 which is connected to the local carrier-current transmitter TM to control its activation. The AND unit 39, as can be seen in FIG. 1, is additionally provided with a NOT input 40 which is responsive to a "stopping" signal supplied thereto, via an OR logic unit 41, another pulse stretching component T5, an AND logic unit 42 and a lead 43, upon operation of the directional sensing means MT and the associated relay ZT. As will be further explained below, the stopping signal is initially absent, and consequently the NOT input to the AND unit 39 is initially on. Unit 39 comprises suitable control means for producing, in instantaneous response to energization by the starting signal, a dependent output control signal which causes activation of TM and hence starts continuous carrier-current transmission from the line terminal E. Later, if and when a stopping signal is supplied to the NOT unit 40, the control means of unit 39 will be rendered ineffective to produce its output control signal which is then cut off or discontinued, thereby deactivating TM and stopping carrier-current transmission from the local terminal. With this arrangement, carrier-current is always started upon the occurrence of a phase fault and is subsequently stopped when the stopping signal appears.

The directional sensing means MT is designed to operate if the phase fault condition has occurred on the protected-line side of the local terminal E. As is indicated in FIG. 1, an "operating" signal as well as the above-mentioned stopping signal is developed upon operation of MT (and ZT). This operating signal is conveyed from the OR unit 41 to an input terminal 44a of a control circuit 8.

Within the control circuit 8, the operating signal when energizing the input terminal 44a is supplied to an AND logic unit 45. As is shown in FIG. 1, a second input for this AND unit 45 is derived from the local carrier-current receiving means RM. The receiving means, when it is actuated by carrier-current transmitted from a remote terminal of the protected line, produces a continuous "blocking" signal which is channeled via an OR logic unit 46, an input terminal 44b and a NOT logic unit 47 to the AND unit 45 of circuit 8. The presence of a blocking signal activates the NOT unit 47 which maintains the AND unit 45 in an "off" state. The combination of units 45 and 47 therefore comprises means for comparing the operating signal to the blocking signal and for keying the succeeding portion of the control circuit only when the former signal is present in the absence of the latter.

The AND unit 45, when on, energizes a timing component T9 of the control circuit 8, and upon the expiration of a predetermined short time delay the timing component thereafter will produce an output. This timing component may take any suitable form, such for example as the time delay pickup and instantaneous dropout circuit which is the claimed subject matter of a copending patent application S.N. 321,072, Scharf, filed on Nov. 4, 1963 and assigned to the assignee of the present application. As is indicated in FIG. 1, its output comprises a "tripping" signal which is utilized to initiate operation of a static switch represented by the block labeled "CR," whereupon the static switch quickly "closes" to cause energization of the trip coil 15 of the local circuit interrupter 13. A dual purpose is served by the relatively short time delay (e.g., 3 milliseconds) which the timing component T9 introduces in the control circuit 8 when system conditions seem otherwise right for operation. It prevents false response to any momentary lapse in carrier current during external faults, and it serves as part of the overall coordination delay which has been deliberately provided in the operating sequence of the relaying system so that local tripping cannot be initiated before the fault detecting and carrier-current transmitting means at any remote terminal of the line have been given ample opportunity to set up a blocking signal at the local terminal E.

From the foregoing description of the control circuit 8 (the details of which are similar to those of the corresponding control circuit more fully shown and described in a copending patent application S.N. 249,791, Mathews, filed on Jan. 7, 1963, and assigned to the present assignee), it is clear that this portion of my system essentially comprises means to initiate tripping of the local circuit interrupter 13 in response to contemporaneous operations of both MT and ZT, which means is disabled or rendered ineffective to accomplish this end by the associated receiver RM so long as an active remote carrier-current transmitter is in communication therewith. Tripping can therefore take place only when such blocking communication ceases, as when the directional sensing means MT is operating and a stopping signal is produced at every terminal of the protected line in response to a true internal phase fault. Once tripping is initiated, the control circuit 8 is "sealed in," until the internal fault is cleared, by an associated circuit which comprises an AND logic unit 49.

One input to the AND unit 49 of the seal-in circuit is supplied, as can be seen in FIG. 1, from a terminal 50a of the control circuit 8 which terminal is energized by the tripping signal. Another input to the same unit is taken from the pulse stretching component T5 which is energized upon operation of the fault responsive distance relay ZB. The output of unit 49 sustains both the operating and stopping signals described hereinbefore. Consequently, the AND unit 49 is effective in response to operation of ZB and production of a tripping signal to maintain the control circuit 8 in an active state and to maintain the local carrier-current transmitter TM deactivated. If desired, the output of the AND unit 49 can additionally be used to initiate certain ancillary functions, such as energizing a scheme (represented by a block labeled "BFI" in FIG. 1) for providing a special indication if the local interrupter should fail to open.

Because of a possibility that the above-described directional-comparison protective relaying system may operate incorrectly if an external fault on a parallel electric power transmission line is cleared sequentially, transient blocking means 51 has been provided. The function of this transient blocking means is to temporarily disable the control circuit 8, and thereby prevent tripping of circuit interrupter 13. whenever an external fault in the power system persists for a predetermined length of time, said length being sufficient to ensure proper operation of the relaying system in response to true internal phase faults. Any external power system disturbance occurring while the control circuit is so disabled cannot then cause false operation of the relaying system.

As can be seen in FIG. 1, the transient blocking means 51 includes a timing component T4 connected to the OR logic unit 46 for energizing the terminal 44b of control circuit 8 whenever T4 is turned on. This timing component is a time delay pick-up and dropout circuit arranged to turn on in response to continuous energization by an input signal for an initial interval of said predetermined length (such as 20 milliseconds), and subsequently to turn off upon the expiration of a predetermined interval of time (such as 25 milliseconds) after its input signal is suspended. Accordingly, commencing as soon as the time interval of said predetermined length has elapsed following the application of an input signal to T4, and continuing for at least the duration of said turn-off interval of time, the timing component T4 is effective to activate the NOT unit 47 of the control circuit 8. While thus activated, the NOT unit 47 renders the AND unit 45 inoperative, thereby blocking the tripping signal at the local terminal E of the protected line even should operating signals momentarily be produced concurrently at all of the line terminals.

The input signal to timing component T4 of the transient blocking means 51 is supplied by an AND logic unit 52 which is energized by the starting signal developed upon operation of the fault responsive distance relay ZB. An is indicated in FIG. 1, the AND unit 52 derives a second energizing input from an OR logic unit 53 which has two parallel inputs; one comprising the blocking signal produced by the local receiver RM; and the other comprising a control signal provided by a NOT logic unit 54 which is energized by the stopping signal referred to hereinbefore. The second-mentioned input to the OR unit 53 therefore reflects the absence of the stopping signal, which means that the local directional sensing means MT (or relay ZT) is not operating. The NOT unit 54 normally enables the AND unit 52 to be turned on in response to a starting signal being applied thereto, but whenever unit 54 is energized by a stopping signal, the AND unit 52 will be disabled unless it is concurrently being energized by a blocking signal supplied by RM. With this arrangement an input signal will be supplied to the timing component T4 of the transient blocking means 51 only on the inception of a power system fault (as indicated by operation of the fault detecting distance relay ZB) located externally to the protected line (as indicated, if the fault is "behind" the local terminal E, by the resulting inoperation of MT, or, if the fault is on the far side of a remote terminal of the line, by the presence of a blocking signal due to carrier current being received from an active transmitter at that remote terminal). The timing component then responds as described above to carry out the intended function of the transient blocking means 51.

Returning again to a consideration of the operation normally expected of my relaying system in response to true internal phase fault conditions, attention will now be given to the selection of the directional sensing means MT, shown in block form at 6 in FIG. 1. Preferably the MT component comprises a distance relay designed for inherent directional response, being well known in the art as a "mho" type relay. While such a relay may be constructed in a variety of different ways, I prefer, in furtherance of the goal of high-speed operation, to utilize a construction which employs what I call a "block-spike" principle of operation. This principle is disclosed in Reissue Patent 23,430, Warrington, originally granted on June 13, 1950, and it will be further explained hereinafter in connection with the circuit diagram of relay MT in its preferred form, illustrated in FIG. 6. For the present it will suffice to understand that the desired mho characteristic is obtained in the contemplated MT relay by making a comparison of the instantaneous values of the two components comprising its A.C. operating quantity (representative of $\bar{V}$ and $\bar{IZ}$, respectively) every time the instantaneous magnitude of its line-voltage derived reference quantity is maximum. If IZ has the same polarity and a higher instantaneous magnitude than V at the instant this comparison is made, the relay will immediately produce an output signal which is conveyed to the AND logic unit 42 by means of the interconnecting lead 43 (see FIG. 1).

Figure 2:
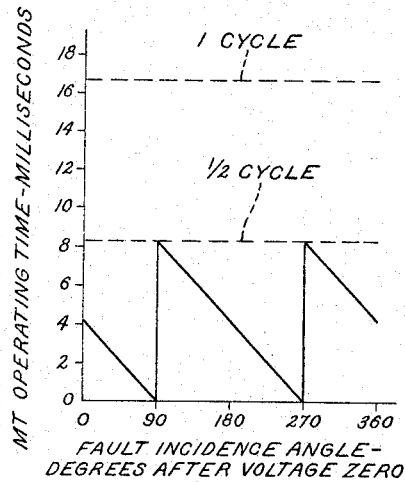
FIG. 2 is a chart of the operating-time v. fault-incidence-angle characteristic of the directional sensing means (MT) of the protective system shown in FIG. 1.

A mho relay of this kind will have a sawtooth characteristic of operating time v. phase angle of fault initiation. It operates only at moments of maximum or peak line voltage. If a fault within its reach should occur just after line voltage has passed its cyclic peak, the operating time will then be approximately one-half cycle (8.33 milliseconds on a 60 c.p.s. power frequency basis). On the other hand, if a fault should occur immediately before a voltage maximum, the operating time is virtually zero. The operating time of the mho relay MT, plotted against the angle of fault incidence, has been illustrated in FIG. 2.

While the preferred construction of the mho relay MT contributes significantly to the ultra-high speed operation of my relaying system when an internal phase fault occurs, it aggravates the problem of preventing false operation of the system under all external fault conditions. The importance of time coordination between relay components at opposite terminals of the protected line, in order to prevent misoperation upon the occurrence of an external fault, has been discussed in the introductory portion of the present specification. Proper coordination requires that the carrier starting function of the fault responsive distance relay ZB be effected sufficiently in advance of the tripping function of the directional sensing mho relay MT to ensure that a blocking signal is established locally, in response to operation of ZB at a remote terminal of the protected line (which response will be delayed by the measurable time required for carrier-current communication), before a tripping signal can be produced at the local terminal due to MT operating when a phase fault occurs beyond the remote terminal. On the other hand, this time coordination should be as short as possible in order to avoid unwanted delay in the response of the relaying system to all internal faults, when high-speed tripping is of primary importance.

Obtaining the requisite time coordination by utilizing the above-mentioned block-spike principle in the design of an "MB" carrier-starting relay and by introducing a definite delay of appropriate length in the relay MT or its succeeding circuits would not be completely satisfactory from the latter point of view. Because of the phase displacement between the line voltages at opposite terminals of the protected line, due to load angle before a fault and the voltage drop along the line itself, the respective instants of voltage maximum at opposite terminals are not coincident. Therefore there is a possibility, when an external fault occurs, that the relay MT located at the tripping terminal might operate substantially instantaneously while operation of an MB relay of identical design at the blocking terminal is taking place near its maximum time (½ cycle). In order to accommodate this possibility, the time coordination would have to be of such an extended length that the normal performance of the system during internal faults would be unsatisfactorily slow.

According to my invention, proper time coordination is obtained and the shortest possible tripping delay is preserved by providing in association with the mho relay MT the additional phase fault responsive relay component 4B shown in FIG. 1 as a block labeled "ZT." The ZT block represents a kind of fault responsive means known in the art as a distance relay, and it is of the same construction as the other distance relay ZB. Preferably both of the relays ZB and ZT are fast operating distance relays of the impedance type, and they may for example utilize an "opposed-voltage" construction the operating principle of which is explained in the aforesaid Patent No. 2,879,454, Hodges et al. A detail circuit diagram of relay ZT in its preferred form has been shown in FIG. 4 soon to be described, and for the present it will suffice to understand that this relay operates whenever the magnitude of a D.C. operating voltage (derived from the A.C. operating quantity supplied to the relay) exceeds the magnitude of a D.C. restraining voltage (derived from the A.C. restraining quantity supplied thereto).

The additional distance relay ZT is arranged to supervise operation of the mho relay MT, this supervision being accomplished in the preferred embodiment of my invention by means of the AND logic unit 42 to which ZT is connected in parallel with MT. As is apparent in FIG. 1, both ZT and MT must be operating contemporaneously to turn on the AND unit 42. Whenever unit 42 is energized by output signals received concurrently from ZT and MT, via the leads 38b and 43, respectively, it energizes the pulse stretching component T5 to which it is connected, and the latter component in turn responds immediately by developing the stopping and operating signals referred to hereinbefore. Consequently, no tripping function can be effected unless both the mho relay MT and its supervising relay ZT are in operation.

In accordance with my invention, the supervising distance relay ZT at each terminal of the protected line is supplied with line-derived quantities which are nearly the same as those supplied to the relay ZB located at the opposite terminal, so long as the line extending therebetween is sound, and these two relays are so arranged that the latter has a greater ohmic reach and a faster speed of operation than the former. (In the preferred embodiment of the invention illustrated in FIG. 1, the leads 30a 30b and 30c from the transformer 30, and also the leads 34a, 34b and 34c from transformer 34, are connected to the local relay ZT, whereby this relay is actually supplied with the same operating and restraining quantities supplied to the companion relay ZB at the same terminal, about which more will soon be said.) The advantages of the foregoing scheme and the improved results thereby obtained will be better understood after considering FIGS. 3a, 3b, and 3c which will now be described.

Figure 3A:
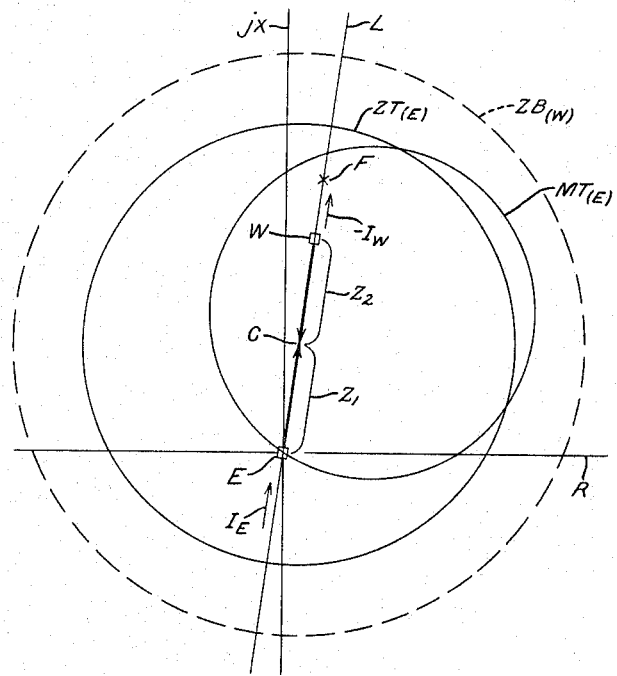
FIG. 3a is a graphical representation of the operating characteristics, in terms of impedance, of certain relay components arranged in accordance with my invention.
Figure 3B:
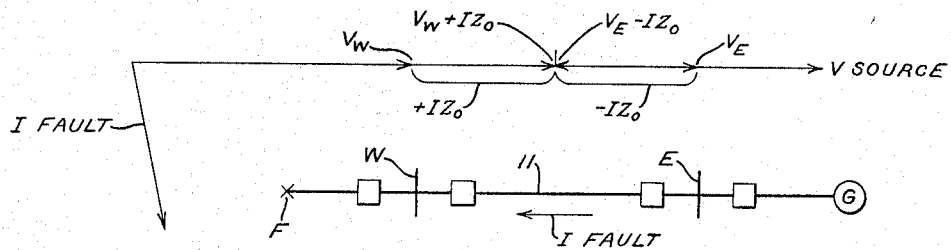
FIGS. 3b and 3c are explanatory one-line and phasor diagrams of an electric power transmission system under external fault and load conditions, respectively.
Figure 3C:
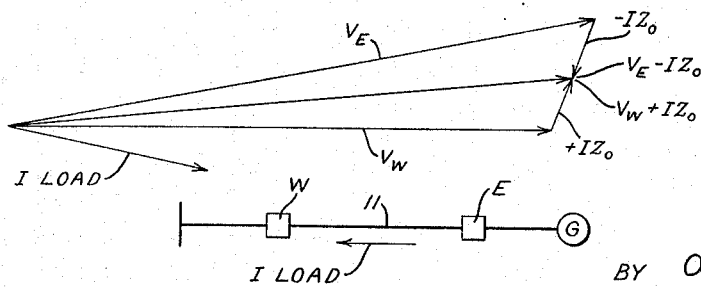

FIGURES 3a, 3b AND 3c

FIG. 3a is a conventional R–X impedance diagram which illustrates the static operating characteristics of certain distance relays of my protective system. The origin E in this diagram represents the point where the current and potential transformers which supply the relays located at the local terminal of the protected section of the electric power system are coupled to the system, while the abscissa R and ordinate jX describe values of resistance and inductive reactance, respectively, as determined by the vectorial relationship between line voltage and current measured by these transformers. Both coordinates R and jX are scaled equally and in the same units, such as ohms. A transmission line has a determinable impedance, a typical line being shown in FIG. 3a where it is identified by the reference letter L. A remote terminal "W" of the line is indicated on L, and the section of the power system being protected, which section extends between terminals E and W, is represented by the heavy portion of the line L.

The circles identified in FIG. 3a by the reference characters $MT_{(E)}$ and $ZT_{(E)}$ represent, respectively, the loci of apparent impedance values which define the operating ranges of the mho relay MT and its supervising impedance relay ZT located at the local terminal E of the protected line. The term "apparent impedance" refers to the ratio of transmission line voltage V to transmission line current I as measured at the local terminal. When a fault or short circuit has occurred in the power system this ratio approximates the actual impedance of the line between relay and fault locations. Any phase fault so located on the line that the impedance to the fault falls within the area circumscribed by the circles $MT_{(E)}$ and $ZT_{(E)}$ will then be within the operating range (ohmic reach) of the relays MT and ZT, respectively, and these relays operatively respond to the incidence of such a fault.

I have also shown on the FIG. 3a R–X diagram the operating characteristic of the fault responsive impedance relay ZB located at the remote terminal W of the protected line. It is depicted by the broken-line circle $ZB_{(W)}$. Since the relay ZB at terminal W is of the same construction as relay ZT at terminal E, and since these two relays are being supplied with similar relaying quantities, their operating characteristics are essentially the same. This means that the circles $ZT_{(E)}$ and $ZB_{(W)}$ have substantially coincident centers "C" and are concentric as shown. Because the relay ZB has been arranged to have the greater reach, the diameter of its operating characteristic is seen to be larger. Sufficient margin is allowed between the operating ranges of these two relays to ensure that relay ZB at terminal W always operates on the occurrence of any fault to which the relay ZT at terminal E will respond, regardless of the fault current phase angle. It should be noted here that both of the relays ZB and ZT, because designed for high-speed operation, have a degree of "angle sensitivity" that will cause their operating characteristics in practice to deviate from the ideal circular configuration shown in FIG. 3a.

The manner in which similar relaying quantities are supplied to the impedance relay ZT at terminal E and to the impedance relay ZB at the opposite terminal W will now be examined, assuming for present purposes that electric power is flowing into the protected line at terminal E and out at W. So long as the line extending between these two terminals is sound, line currents at the respective terminals will be identical whereby the operating quantities (proportional to line current) being applied to these two relays are the same. Under like conditions, however, the line voltages at opposite terminals are unequal (because of load angle and line drop), but the voltage-derived restraining quantities which are applied respectively to the aforesaid relays have been equalized by the introduction of the compensating voltages mentioned hereinbefore. Thus the restraining quantity applied to relay ZT at terminal E is made proportional to the vectorial combination of line voltage less a compensating voltage related to line current by a predetermined first constant impedance $\overline{Z}_1$, and the restraining quantity applied to relay ZB at terminal W is made proportional to the vectorial combination of the line voltage there plus a compensating voltage related to the same line current by a second predetermined constant impedance $\overline{Z}_2$. These two compensating voltages are so chosen that their vector sum is approximately equal to the difference between the line voltage at terminal W and line voltage at terminal E, and therefore the restraining quantity applied to one relay at a given terminal is approximately the same as that supplied to the other relay at the opposite terminal under pre-fault or external fault conditions.

In terms of impedance, this desired result is obtained by selecting the above-mentioned first and second impedances $\overline{Z}_1$ and $\overline{Z}_2$ so that their vector sum approximates the impedance of the protected line which extends between the respective terminals E and W. This is indicated on the FIG. 3a R–X diagram where the vectors $Z_1$ and $Z_2$ are seen offsetting the impedance operating characteristics, with respect to the origin, by ideally equal amounts. The center of the operating characteristic $ZT_{(E)}$ is offset from terminal E, in the direction of terminal W, by the vector $Z_1$, and the center of the operating characteristics $ZB_{(W)}$ is offset from terminal W, in the direction of E, by the vector $Z_2$. Since $\overline{Z}_1$ and $\overline{Z}_2$ when vectorially added are approximately equal to the EW line impedance, these offset centers substantially coincide.

In the illustrated embodiment of my invention, the actual (and relative) values of $\overline{Z}_1$ and $\overline{Z}_2$ are determined by the design of transactors on whose transfer impedances these values depend. I prefer to use an arrangement wherein the predetermined impedance which interrelates line current and the compensating voltage of the restraining quantity supplied to the impedance relay ZB at the local terminal E is made equal to $\overline{Z}_1$ at the same terminal, whereby all of the requisite compensating voltages can be derived with the provision of but one pair of transactors (28a and 28b in FIG. 1) at each terminal of the line. This then enables both impedance relays at a line terminal to be supplied by restraining quantities taken from a common source (transformer 34 in FIG. 1).

Furthermore, in order to minimize the farthest extent of the operating ranges of the relays ZB and ZT beyond either end of a 2-terminal transmission line, and to optimize the load-carrying capability of the line, the transactors 28a, 28b at both of the line terminals E and W are preferably arranged to compensate for approximately one-half of the line impedance. Hence the transfer impedances of the transactors 28a, 28b at the respective terminals are so selected that $\overline{Z}_1$ and $\overline{Z}_2$ are both equal to an offset impedance $\overline{Z}_0$ which ideally is one-half the impedance of the protected line, and the centers C of the operating characteristics $ZT_{(E)}$ and $ZB_{(W)}$ coincide at the middle of the line as is shown in FIG. 3a. In practice the angle of the offset impedance $\overline{Z}_0$, which angle can be made to approach 85° by minimizing the load in the secondary circuit of the interconnected transactors 28a and 28b, need not exactly duplicate the angle of the line impedance; if the discrepancy therebetween were no more than a few degrees the restraining quantities at opposite terminals should be sufficiently similar to ensure proper response of the relaying system to all external fault conditions.

FIGS. 3b and 3c are included to illustrate more clearly the scheme shown in FIG. 1 and explained in the preceding four paragraphs. During external phase fault conditions, such as indicated at F in FIG. 3b, fault current I flowing from a power source G enters the line 11 at terminal E and leaves it at terminal W. The line voltage $V_W$ at terminal W is smaller than the line voltage $V_E$ at terminal E by the amount of line drop. The restraining quantity supplied to the impedance relay ZT at the tripping terminal E is proportional to $\overline{V}_E - \overline{IZ}_0$ where $\overline{IZ}_0$ is the compensating voltage referred to hereinbefore. At the blocking terminal W the restraining quantity supplied to the impedance relay ZB is proportional to $\overline{V}_W + \overline{IZ}_0$, the compensating voltage being of opposite sign because the direction of current flow at terminal W has reversed with respect to its direction at terminal E. The resulting equality of the restraining quantities at opposite terminals is apparent in FIG. 3b.

Even before an external fault occurs, the restraining quantities supplied to the impedance relays ZT and ZB located at opposite terminals of the protected line are substantially the same. This is illustrated in FIG. 3c in which the phasors of FIG. 3b are depicted as they appear during typical load conditions.

For reasons of economy, electric power transmission lines are sometimes arranged to interconnect three terminals instead of two. It is often possible to apply my system of protection to this more complex situation, simply by choosing the value of offset impedance $Z_0$ at each of the respective line terminals so that the resultant restraining voltage applied to ZB and ZT of each terminal represents the voltage at the junction of the 3 branches of the power circuit, rather than the voltage at a mid-point between any pair of terminals. It will be seen that this does not require all 3 branches of the line to be of equal length.

It is well known to those skilled in the art that if one branch of a 3-terminal line carries the sum of the currents of two other branches, there is an increase in the apparent impedance of the joint branch, calculated from the current and voltage at the end of either of the source branches. It is also well known that this increase in apparent impedance makes it necessary to decrease the restraining quantity of the impedance units, relative to the operating quantity, in order that those units may respond to all faults in the line regardless of their location. Depending on quantitative relations, this increased sensitivity of the ZT and ZB relays may or may not cause these relays to respond to load currents, with the origins of their operating characteristics located at the junction of the 3 branches of the line. If they do not respond to load currents in the case of a given line, my system of protection can be applied to that 3-terminal line at no sacrifice in operating time. (If they do respond to load currents in the case of some other line, it is necessary to forego the use of a common origin for the characteristics of all of the ZT and ZB relays, and to add enough coordination delay to allow for the changes in relative operating times, caused by the maximum pre-fault difference in phase and magnitude of the restraining quantities of relays at different terminals.)

Those skilled in the art will appreciate that the scheme described hereinbefore results in the aforesaid impedance relays having the same transient response to the occurrence of any external phase fault within the reach of ZT, regardless of the angle of fault incidence. Both of the relays, both before and during external fault conditions, are supplied with the same operating quantities and nearly the same restraining quantities, and consequently they "see" the same transient changes in these quantities when such a fault first occurs. With ZT designed to be slightly slower operating than ZB, my scheme ensures advance operation of ZB at the blocking terminal in response to any external phase fault located within the reach of both ZT and the mho relay MT at the tripping terminal, whereby the desired time coordination between opposite terminals is assured and proper blocking action is obtained at every terminal of the line. Yet relatively high-speed tripping on the occurrence of any internal phase fault is preserved because the operating time of MT and the time delay introduced by ZT are not pyramided. Rather, the operations of these two components are allowed to take place concurrently, and tripping is delayed by ZT only if and to the extent it takes longer than MT to operate. Since ZT itself is a fast operating relay, there is no serious loss in the overall speed of my relaying system under internal fault conditions. In this connection, it should be noted that ZT in its preferred form, to be described in detail below, actually requires less time than MT to operate for fault incidence angles falling within the range of 90–180 and 270–360 degrees, and for other angles its maximum operating time is less than 5 milliseconds.

FIGURE 4

Figure 4:
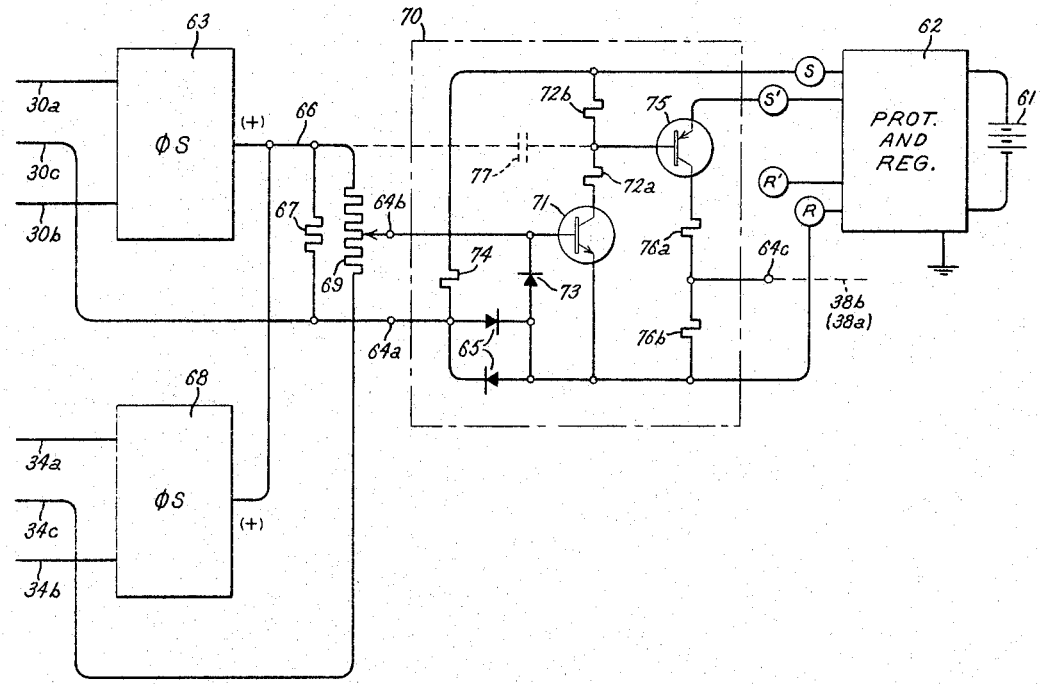
FIG. 4 is a circuit diagram of the impedance type distance relays (ZB and ZT) shown in block form in FIG. 1.

Having explained the overall operation of my relaying system with reference to FIGS. 1, 2 and 3a–3c, I will now describe in greater detail the preferred circuitry and operation of certain components of the system. FIG. 4 is a circuit diagram of a distance relay of the kind which I prefer using for the ZB and ZT components shown as blocks 4a and 4b in the FIG. 1 schematic diagram. The relay shown in FIG. 4 receives an A.-C. operating quantity (proportional to $\overline{IZ}$) from leads 30a, 30b and 30c, and an A.C. restraining quantity (proportional to $\overline{V}-\overline{IZ_0}$) from leads 34a, 34b and 34c. It also receives control power from a source of regulated D.-C. supply voltage which comprises, for example, a battery 61 having connected thereto suitable protection and regulating means 62. For the sake of drawing simplicity, I have used throughout the drawings the encircled letters R and S to represent, respectively, a common reference bus (energized from the negative terminal of the battery 61) and a supply voltage bus which is positive with respect to the reference bus. The magnitude of the supply voltage is preferably about 20 volts. For convenience I also derive from this source two other buses which are energized by bias potentials: the negative bias bus, represented by the encircled letter R', has a level of potential slightly more positive than the reference bus R; and the positive bias bus, represented by the encircled S', has a level of potential slightly less positive than the supply voltage bus S.

As can be seen in FIG. 4, the incoming leads 30a and 30b are connected to a phase splitting and rectifying device 63 which is shown as a block labeled $\phi$S, and lead 30c is connected to the reference bus R by way of a terminal 64a and a circuit comprising two oppositely poled diodes 65 interconnected in parallel relationship. A wire 66 is connected to the output of the device 63 for energization by its rectified output potential, which is positive with respect to the lead 30c. A resistor 67 interconnects the lead 30c and wire 66. The device 63 is capable of providing across resistor 67 a D.-C. output voltage which is dependent upon the amplitude of the A.-C. voltage being applied thereto via leads 30a and 30b, the output voltage having significantly reduced ripple and yet being substantially instantaneously responsive to any amplitude variations in the A.-C. input. This output voltage, being derived from the A.-C. operating quantity, comprises a unipolarity operating voltage for the relay, and during operating conditions it is representative of the magnitude of transmission line current.

The incoming leads 34a and 34b are connected to another phase splitting and rectifying device 68 which is shown in FIG. 4 as a block labeled $\phi$S, and the rectified output of this device also energizes the wire 66 to which it is connected, this energization being of positive potential relative to the lead 34c. The lead 34c and the wire 66 are interconnected by a potentiometer 69 having a slider which is connected to a terminal 64b. The device 68 is capable of providing across potentiometer 69 a D.-C. output voltage dependent upon the amplitude of the A.-C. voltage applied thereto via the leads 34a and 34b, this output voltage having significantly reduced ripple and yet being responsive with practically no time lag to any amplitude variations in the A.-C. input. The portion of this output voltage taken between the slider of the potentiometer 69 and wire 66, being derived from the A.-C. restraining quantity, comprises a unipolarity restraining voltage for the relay, and during non-operating condition it is representative of the magnitude of the vectorial combination of transmission line voltage and the aforesaid compensating voltage.

Preferably each of the phase splitting and rectifying devices 63 and 68 comprises the improved system which is the claimed subject matter of my Patent 3,088,066 granted on Apr. 30, 1963.

By interconnecting the operating voltage source 30, 63 and the restraining voltage source 34, 68 as is shown in FIG. 4, the unipolarity operating and restraining voltages derived respectively thereby are applied in voltage opposing relationship to the terminals 64a and 64b, and whenever the restraining voltage magnitude is less than the instantaneous magnitude of the operating voltage there will be developed between these two terminals a difference voltage of such polarity that terminal 64b is positive with respect to terminal 64a. This difference voltage operatively energizes electroresponsive means 70 connected to the terminals 64a and 64b, and the electroresponsive means responds thereto by immediately producing an output signal at a terminal 64c to which the lead 38b (or 38a in the case of relay ZB) is connected.

The electroresponsive means 70 in its preferred form is shown in detail in FIG. 4. It comprises an NPN transistor 71 whose emitter is connected directly to the reference bus R and whose collector is connected to the supply voltage bus S by way of a load impedance comprising a pair of resistors 72a and 72b in series. The base electrode of transistor 71 is connected to the terminal 64b for energization by the above-mentioned difference voltage, and the two oppositely poled diodes 65 are connected in parallel relationship between the emitter of transistor 71 and terminal 64a. Another diode 73 is connected in shunt with the emitter-base junction of the transistor 71, being oppositely poled with respect thereto, and a resistor 74 interconnects terminal 64a and the supply voltage bus S.

It will be observed in FIG. 4 that a closed loop circuit is formed by the source of D.-C. operating voltage 30, 63, wire 66, the tapped portion of potentiometer 69, terminal 64b, the emitter-base junction of the transistor 71, one of the diodes 65, and the terminal 64a. The operating voltage tends to send current through this loop, while the restraining voltage introduced between wire 66 and terminal 64b, being poled in the opposite sense, opposes such current flow. Whenever the operating voltage attains a magnitude exceeding the restraining voltage magnitude by the sum of the forward voltage drops of a diode 65 and the emitter-base junction of transistor 71, the difference voltage across terminals 64a and 64b will be effective to circulate energizing current through the above-mentioned loop circuit, thereby activating the transistor 71. Whenever the transistor 71 is thus activated, its emitter-collector circuit readily conducts load current and a resultant unidirectional voltage signal is produced across resistor 72b, the junction of resistors 72a and 72b being then appreciably negative with respect to the supply voltage bus S. An inverting transistor 75 of the PNP type is disposed for activation in response to the production of this resultant signal.

As can be seen in FIG. 4, the base electrode of the inverting transistor 75, which is normally inactive, is connected to the junction between resistors 72a and 72b. The emitter of transistor 75 is connected directly to the positive bias bus S', and its collector is connected through two voltage dividing resistors 76a and 76b to the reference bus R, the latter resistor having a much greater resistance value than the former. A portion of load current conducted by transistor 71 when active will follow a path through the emitter-base junction of transistor 75, thereby forward biasing the same, and the latter transistor is turned on and off simultaneously with the former. While the transistor 75 is off, no current of appreciable magnitude can flow in the resistor 76b and hence the level of potential at the junction between the voltage dividing resistors 76a and 76b is substantially the same as that of the reference bus R. Under such conditions the terminal 64c, which is connected to the junction of resistors 76a and 76b, is de-energized. But when transistor 75 is turned on there is developed across the resistor 76b a unidirectional voltage of substantially constant magnitude nearly equal to the magnitude of the supply voltage, and this voltage, taken from terminal 64c, comprises the output signal produced by the electroresponsive means 70.

The above-described circuit, which is used in the preferred embodiments of both of the impedance relays ZT and ZB, operates in high-speed response to a predetermined magnitude difference between the operating quantity proportional to I) and the restraining quantity (proportional to $\overline{V}-\overline{I}\overline{Z}_0$) to produce an output signal which energizes the connected lead 38b (or 38a). I have already pointed out that relay ZB is designed to have greater ohmic reach and a shorter operating time than ZT, and the preferred manner of obtaining these particular results will now be explained. The operating range or reach of relay ZB is made greater simply by raising the setting of the slider of its potentiometer 69 so as to tap a lower percentage of total resistance (e.g., 68% v. 85% for relay ZT), whereby less restraining voltage is applied to terminal 64b, in series with the same operating voltage source, in the case of ZB than in the case of ZT.

This difference in the magnitude of restraining voltage contributes to the faster operating speed of relay ZB. When a phase fault occurs within the reach of both relays, the operating voltage contributed by the source 30, 63 increases at a finite rate, and therefore the predetermined difference voltage required for relay activation is attained in the relay (ZB) which has the lower restraining voltage magnitude prior to the same difference voltage being attained in the other relay (ZT). In the event the fault incidence angle is such that an abrupt and substantial collapse of restraining voltage magnitude accompanies the fault, I ensure even faster response by relay ZB by utilizing therein, in accordance with the teachings of the Hodges et al. patent previously cited, a potential coupling capacitor 77 which is connected between wire 66 and the junction of resistors 72a and 72b.

The capacitor 77, being provided in relay ZB only, is shown in FIG. 4 in broken lines interconnecting the wire 66 and the base electrode of the transistor 75. Under steady-state pre-fault conditions, the capacitor 77 is in a charged state, with its voltage being approximately equal to the difference between the D.C. restraining voltage and the supply voltage magnitudes. Upon a sudden decrease in the magnitude of restraining voltage, the wire 66 immediately becomes less positive, and the capacitor 77 will quickly discharge. This forces the production of the aforesaid resultant unidirectional voltage signal across resistor 72b, and a portion of the capacitor discharge current is driven in the forward direction through the emitter-base junction of transistor 75 to instantly activate or turn on this transistor, whereby an output signal is substantially instantaneously developed at terminal 64c. Since the ZT relay circuit is not equipped with such a transient responsive capacitor, it will not start operating as fast.

FIGURE 5

The output signal of the impedance relay ZB is utilized to energize a pulse stretching component T5 which has been shown in block form in FIG. 1, and the detail circuitry of the preferred embodiment of this component will now be described with reference to FIG. 5. This particular circuit is the claimed subject matter of the above-cited copending patent application S.N. 321,072, Scharf. It is an instantaneous pickup, time delay dropout circuit whose intended function is to develop a sustained output signal in substantially instantaneous response to energization by an input signal or voltage pulse of positive polarity with respect to the reference bus R. The pulse stretching circuit is designed to sustain its output signal continuously for a predetermined minimum interval of time, such as 9 milliseconds, even if its input signal should persist for only a brief moment. By utilizing such a component in conjunction with relay ZB, the production of a continuous starting signal is assured even though ZB, due to its angle sensitivity, is operating intermittently in response to a phase fault located just barely within its reach.

Figure 5:
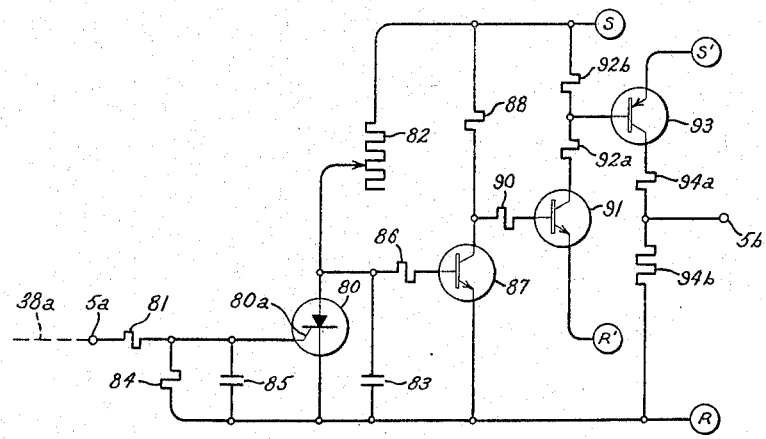
FIG. 5 is a circuit diagram of the pulse stretching component blocks T5 shown in FIG. 1.

As can be seen in FIG. 5, the pulse stretcher comprises a solid state controlled rectifier 80 whose gate electrode 80a is connected by way of a current limiting resistor 81 to an input terminal 5a for energization by the output signal of relay ZB which is supplied thereto via the interconnecting lead 38a. The cathode of the controlled rectifier 80 is connected directly to the reference bus R, and its anode is connected to the junction of a rheostat 82 and capacitor 83 which are interconnected in series between the supply voltage bus S and the reference bus R. The controlled rectifier 80 is normally "open," and the capacitor 83 is normally charged. A parallel combination of a resistor 84 and a surge suppressing capacitor 85 of relatively small capacitance is connected between the cathode and gate electrode of the controlled rectifier 80 to prevent activation of this device by stray voltage transients or spurious surges.

Until triggered or activated by a small "gate current" in its gate electrode 80a, the controlled rectifier 80 blocks current flow and hence it is in effect an open circuit. When so triggered, however, it will abruptly change to a low-forward-impedance state in which its anode-cathode circuit can readily conduct load current. So long as the anode current then exceeds a predetermined minimum value (the "holding current") required to sustain conduction in a controlled rectifier of the type illustrated, this device remains active even after the gate signal is removed.

Whenever the input terminal 5a of the pulse stretching component is momentarily energized by a signal such as that which is supplied via lead 38a upon operation of the impedance relay ZB, gate current of appropriate magnitude and duration for triggering the controlled rectifier 80 is supplied to this device. The controlled rectifier 80 immediately "closes," thereby discharging the capacitor 83 completely, and the capacitor discharge current rapidly decays to a value less than holding current. As a result, there is insufficient anode current in the controlled rectifier 80 to sustain conduction after the gate signal is removed, and the controlled rectifier 80 will immediately revert to its open, inactive state whenever the input terminal 5a is deenergized. The capacitor 83 then responds by recharging through the rheostat 82, the time constant of this recharging operation being determined by the rheostat adjustment.

The voltage level across capacitor 83 is utilized to control the succeeding portions of the circuit shown in FIG. 5. Connected to the junction of rheostat 82 and capacitor 83, by way of a current limiting resistor 86, is the base electrode of an NPN transistor 87 whose emitter is connected directly to the reference bus R and whose collector is connected through a load resistor 88 to the supply voltage bus S. The collector of transistor 87 is also connected through a current limiting resistor 90 to the base electrode of a normally inactive NPN transistor 91. The emitter of the latter transistor is connected directly to the negative bias bus R', while its collector is connected to the supply voltage bus S by way of a load impedance comprising a pair of resistors 92a and 92b in series.

So long as the capacitor 83 is in its normally charged condition, the emitter-base junction of transistor 87 is forward biased and this transistor is in a conductive (active) state. As a result, the emitter-base junction of the companion transistor 91 is reverse biased, and this transistor is "off." The capacitor 83, however, will become discharged whenever the controlled rectifier 80 is closed in response to an energizing signal being applied to terminal 5a, and under these circumstances forward bias current in the emitter-base junction of transistor 87 can no longer be sustained, whereby this transistor is inactive or turned off. The transistor 87 will remain off while the capacitor 83 remains discharged and for a predetermined additional interval of time commencing as soon as the capacitor begins to recharge in response to the opening of the controlled rectifier 80. This predetermined time interval, which is dependent upon the time constant of the charging circuit of capacitor 83 and can be made 9 milliseconds, for example, expires when the voltage across the recharging capacitor 83 attains the threshold level required to effect forward current flow in the emitter-base junction of transistor 87, whereupon this transistor is again turned on.

Throughout the period that the transistor 87 is off, the companion transistor 91 is on. As can be seen in FIG. 5, the junction of the resistors 92a and 92b in the load circuit of transistor 91 is connected to the base electrode of a normally inactive PNP transistor 93 whose emitter is connected to the positive bias bus S' and whose collector is connected through two voltages dividing resistors 94a and 94b to the reference bus R, resistor 94b having a much greater resistance value than 94a. Whenever transistor 91 is on, a portion of its collector current will follow a path through the emitter-base junction of transistor 93, thereby forward biasing the same, and the latter transistor is turned on and off simultaneously with the former. An output terminal 5b connected to the junction of resistors 94a and 94b is at substantially the same level of potential as the reference bus R while the transistor 93 is off. But whenever transistor 93 is turned on, as it is throughout the periods of inactivation of transistor 87, there is developed across resistor 94b a D.C. voltage of substantially constant magnitude nearly equal to the magnitude of the supply voltage, and this voltage, taken from terminal 5b, comprises the output signal of the pulse stretching component shown in FIG. 5.

It will be apparent from the foregoing description of FIG. 5 that the pulse stretcher operates to produce an output signal at terminal 5b in substantially instantaneous response to the energization of its input terminal 5a and to sustain this output signal for a predetermined time interval following the termination of said energization. The predetermined time interval is dependent upon the time constant of the charging circuit for capacitor 83, and in the preferred embodiment of the pulse stretcher this time constant is so selected, by proper adjustment of the rheostat 82, that the aforesaid time interval is equal to approximately 9 milliseconds (slightly longer than one-half of a power frequency cycle, on a 60 c.p.s. basis). It will be observed that should an energizing signal recur at any time during this 9-millisecond interval, the controlled rectifier 80 is then triggered and the capacitor 83 is again discharged completely, whereby the timing of a 9-millisecond interval must start anew.

FIGURES 6 AND 7

Figure 6:
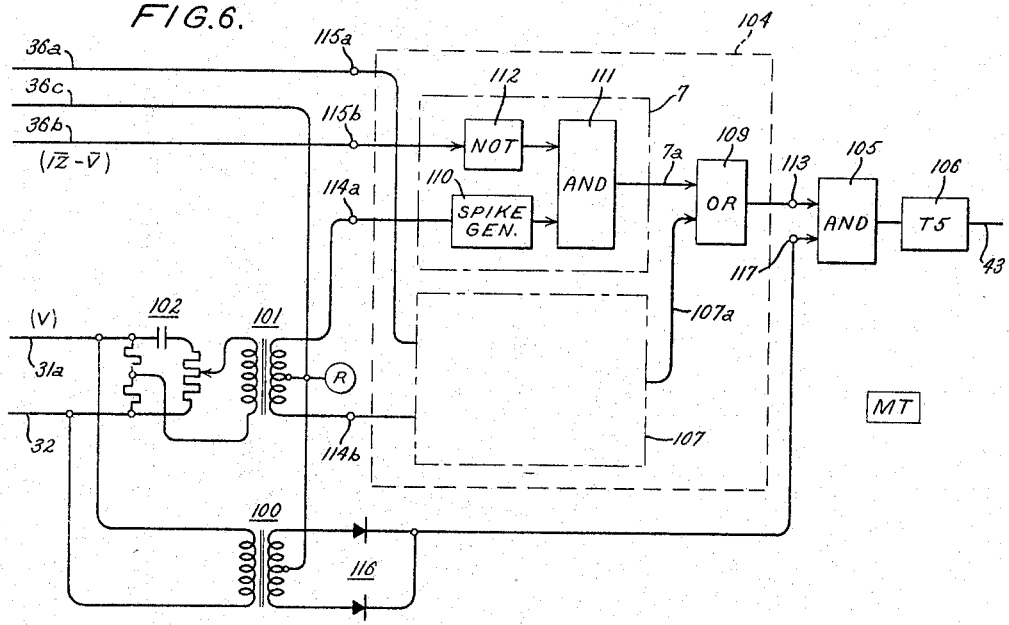
FIG. 6 is a detail block diagram of the directional sensing means (MT) which is represented by a single block in FIG. 1.

Referring next to FIG. 6, I have there shown a detailed block diagram of a directional sensing distance relay of the kind preferably utilized for the mho relay MT which is represented by a single block 6 in the FIG. 1 schematic diagram. The relay shown in FIG. 6 receives an A.C. operating quantity (proportional to $\overline{IZ}-\overline{V}$) from leads 36a, 36b and 36c and an A.C. reference quantity (dependent on steady state transmission line voltage V) from leads 31a and 32. The reference quantity is supplied to two isolating transformers 100 and 101, each having a mid-tapped secondary winding. The primary winding of transformer 100 is connected directly across leads 31a and 32, while the primary winding of transformer 101, for reasons soon to be explained, is connected to the same leads by way of a phase-shift circuit 102 so designed and adjusted as to retard the A.C. secondary voltage of transformer 101 (referred to hereinafter as the polarizing voltage) 90 electrical degrees with respect to the A.C. reference quantity. The midtaps of the secondary windings of transformers 100 and 101 are both connected to the D.C. reference bus R, as is the lead 36c.

As is indicated in FIG. 6, the mho relay MT includes (1) measuring and pulsing means 104 for providing a pulsed output signal if the operating quantity ($\overline{IZ}-\overline{V}$) has the same polarity as the reference quantity when the instantaneous magnitude of the latter is maximum, (2) control and protective means 105 for preventing false operation of the relay when an external phase fault occurs in the electric power system near the local terminal of the protected line, and (3) a pulse stretching component 106 for stretching the pulsed signal provided by 104 into a continuous output signal which energizes the lead 43 emanating therefrom. The measuring and pulsing means 104, more specifically, is arranged effectively to compare the instantaneous magnitude of $\overline{IZ}$ and $\overline{V}$ every time the instantaneous magnitude of $\overline{V}$ is maximum, and to produce an output voltage pulse or signal if the comparison reveals that $\overline{IZ}$ at that moment has the same polarity and a higher instantaneous magnitude than $\overline{V}$. The instantaneous magnitude of $\overline{IZ}$ when this comparison is made can be shown to be equal to $IZ \cos(\phi-\theta)$, where $\phi$ is the phase angle by which line current lags transmission line voltage and $\theta$ is the predetermined angle by which $\overline{IZ}$ leads line current. Consequently, the means 104 will operate only if the ratio of line voltage (V) to line current (I), as measured at the local line terminal, is less than $Z \cos(\phi-\theta)$. This characterizes a mho relay, and the resulting operating characteristic has been depicted in the FIG. 3a R–X diagram by the circle $MT_{(E)}$.

In the illustrated embodiment of the mho relay MT, the measuring and pulsing means 104 comprises identical "block-spike" components 7 and 107 connected in parallel to an OR logic unit 109. While the components 7 and 107 can take any suitable form for accomplishing their intended functions, each in its preferred form comprises a spike generator 110 the output of which supplies an input signal for an AND logic unit 111 whose other input is derived from a NOT logic unit 112. (These parts, which have been shown symbolically in FIG. 6, are revealed in still greater detail in FIG. 7, soon to be described.) The output of the AND unit 111 of component 7 is conveyed by a lead 7a to the OR unit 109, and an alternative input (lead 107a) for the latter unit is furnished by the output of a corresponding AND unit in the identical block-spike component 107. As can be seen in FIG. 6, the OR unit 109 is connected to an output terminal 113 of the measuring and pulsing means 104, and an output voltage pulse is there produced whenever the AND unit 111 of either component 7 or 107 is turned on.

The AND unit 111 is turned on each time the generator 110 generates a spike of voltage of positive polarity with respect to the reference bus R, so long as the NOT input 112 to this unit is on at that same moment. (By definition, the unit 112 is "on" in the absence of a positive input signal.) The spike generator is responsive to the polarizing voltage. The polarizing voltage for spike generator 110 in the component 7 is taken from the upper end of the secondary winding of transformer 101 to which this generator is connected, via a terminal 114a as shown. Once every cycle, just as the polarizing voltage being applied to terminal 114a changes from negative to positive relative to the reference bus R, the generator 110 operates to produce a positive voltage spike (also referred to hereinafter as the gating pulse), and it will be observed that in component 7 this moment coincides, because of the 90-degree phase-shift circuit 102 referred to hereinbefore, to the instant that the instantaneous magnitude of the A.-C. reference quantity (proportional to V) is at its relatively positive peak.

The gating pulse generated by 110 turns on the AND unit 111 unless the associated NOT unit 112 is then off. The NOT unit 112 is responsive to the A.-C. operating quantity supplied to the relay MT, and it is turned off whenever an input voltage of positive polarity relative to the reference bus R is applied thereto. Since turn-on of the AND unit 111 by the spike generator 110 in component 7 is desired if the operating quantity is positive, the NOT unit has been arranged to be supplied by a relatively negative input voltage under such circumstances. This is accomplished by connecting the NOT unit 112 of component 7, via a terminal 115b, to the lower lead 36b, whereby this unit is energized in accordance with the polarity of $\overline{V}-\overline{IZ}$ and is "on" whenever the instantaneous value of IZ is positive and of higher magnitude than $\overline{V}$.

As is shown in FIG. 6, corresponding terminals 114b and 115a of the companion block-spike component 107 are connected, respectively, to the lower end of the secondary winding of transformer 101 and to the upper lead 36a. Component 107, which is the same as component 7 internally, serves to produce an output voltage pulse at lead 107a if the operating quantity is negative when the A.-C. reference quantity is at its relatively negative peak. Thus the components 7 and 107 are alternatively responsive during the "positive" and "negative" half cycles, respectively, of the quantities as supplied thereto, and under operating conditions the measuring and pulsing component 104 derives at its output terminal 113 a succession of output voltage pulses spaced at half-cycle intervals.

The above-mentioned voltage pulses are utilized to energize the control and protective means 105 which is connected to terminal 113. As is indicated in FIG. 6, the control and protective means 105 comprises an AND logic unit which, in addition to the pulsed input received from terminal 113, is provided with a second input derived from the reference quantity by way of the transformer 100, a full-wave rectifier comprising a pair of diodes 116 connected as shown, and a terminal 117. Thus the unit 105 cannot be turned on by a voltage pulse produced by the measuring and pulsing means 104 unless the instantaneous magnitude of the reference quantity is above a predetermined level required for effective energization of this unit. The purpose of this particular arrangement, which is more fully explained and is claimed in a copending patent application S.N. 256,700, Mathews, filed on Feb. 6, 1963 and assigned to the assignee of the present application, is to prevent operation of the mho relay MT in the event the peak magnitude of the A.-C. reference quantity is so low that operation of the spike generator at the proper instant of time cannot be ensured.

The AND unit 105 when on energizes the pulse stretching component 106 which is shown in FIG. 6 as a block labeled "T5." This component preferably comprises the same circuit that has been described hereinbefore with reference to FIG. 5. It will develop a sustained output signal at the connected lead 43 in substantially instantaneous response to the receipt of a signal pulse from the AND unit 105, the output signal being sustained continuously so long as the pulsed signals are recurring at one-half cycle intervals.

Having described with reference to FIG. 6 the various parts of the spike-block component 7 of the mho relay MT in its preferred form, consideration will next be given to FIG. 7 which reveals actual circuits for carrying out the functions of these parts. The circuitry of component 7, as it is shown in FIG. 7, is the claimed subject matter of a copending patent application S.N. 256,955, Waldron, filed on Feb. 7, 1963, and assigned to the assignee of the present application.

Figure 7:
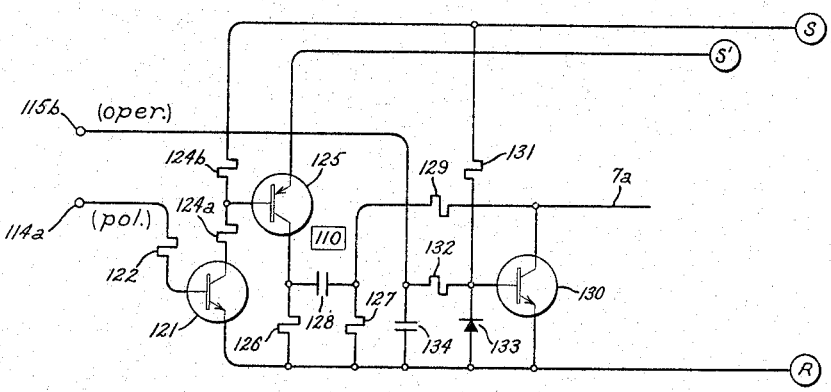
FIG. 7 is a circuit diagram of the components of FIG. 6 which are encompassed by broken line 7.

The circuits illustrated in FIG. 7 include an NPN transistor 121 whose emitter is connected directly to the reference bus R and whose base electrode is connected by way of a current limiting resistor 122 to the terminal 114a for energization by the polarizing voltage. The collector of transistor 121 is connected to the supply voltage bus S by way of a load impedance comprising a pair of resistors 124a and 124b in the series. Whenever the polarizing voltage applied to terminal 114a is of positive polarity relative to the reference bus R and its instantaneous magnitude is above the relatively low threshold level required to effect forward current flow in the emitter-base junction of transistor 121, this transistor is active.

During the intervals of inactivation of the transistor 121, no current of appreciable magnitude can flow in its load impedance and hence there is negligible voltage drop across resistor 124b. But when activated by a positive half cycle of the polarizing voltage applied to terminal 114a, the emitter-collector circuit of transistor 121 readily conducts load current and the junction between resistors 124a and 124b becomes appreciably negative, with respect to the supply voltage bus S. This junction is connected to the base electrode of a normally inactive PNP transistor 125 whose emitter is connected directly to the positive bias bus S', and whose collector is connected through a resistor 126 to the reference bus R. A portion of a load current conducted by transistor 121 will follow a path through the emitter-base junction of transistor 125, thereby forward biasing the same, and the latter transistor is turned on and off simultaneously with the former.

As can be seen in FIG. 7, a series RC circuit comprising a resistor 127 and a capacitor 128 of relatively low capacitance is connected across the load resistor 126 of the transistor 125, and the junction between the components of this circuit is connected to the lead 7a via a resistor 129. So long as the transistor 125 is off, the level of potential of its collector is substantially the same as that of the reference bus R, and the capacitor 128 of the RC circuit is in a discharged state. The lead 7a is then deenergized. But each time transistor 125 is turned on, its collector potential will be elevated to a level nearly equal to that of the positive bias bus S′, and the potential of the junction between resistor 127 and capacitor 128, due to the constant voltage characteristic of the latter, immediately becomes appreciably positive relative to the reference bus R. The capacitor now charges quickly, and the initial voltage across resistor 127 rapidly decays at a rate dependent upon the time constant of the charging circuit. I select a relatively short time constant, such as 0.1 millisecond, whereby the voltage thus produced across resistor 127 in response to the turn-on of transistor 125 endures for only a brief moment. This then is the spike of positive voltage (the gating pulse) referred to hereinbefore, and the combination of the two transistors 121 and 125 and the RC circuit 127, 128 is seen to comprise the spike generator 110 of the spike-block component 7 of the mho relay illustrated in FIG. 6.

The gating pulse generated across resistor 127 in the above-described manner is utilized to energize the outgoing lead 7a. However, the lead 7a is normally clamped to the reference bus R by an NPN transistor 130 connected therebetween. As is shown in FIG. 7, the emitter of transistor 130 is connected directly to R, and its base electrode is connected through a bias resistor 131 to the supply voltage bus S. Consequently, forward bias current is normally being supplied to the emitter-base junction of the transistor 130 and the transistor is effective to short down the aforesaid gating pulse and maintain the lead 7a deenergized, unless this result is precluded by the application of a negative-going deactivating signal to the transistor 130. Such a negative-going deactivating signal is derived from the A.C. operating quantity which energizes terminal 115b, the base electrode of transistor 130 being connected to this terminal through a current limiting resistor 132 of much smaller resistance value than the bias resistor 131.

Whenever the voltage applied to terminal 115b is of negative polarity relative to the reference bus R and its instantaneous magnitude is greater than a predetermined critical amount (which is relatively small), the emitter-base junction of transistor 130 will be reverse biased and this transistor is inactive. During an interval of inactivation of the transistor 130, its emitter-collector circuit will be in a relatively high-impedance state and no load current of appreciable magnitude can be conducted thereby. A diode 133 connected in shunt with the emitter-base junction of transistor 130 and poled as shown in FIG. 7 is provided to protect this junction from damagingly high reverse voltage when the operating voltage applied to terminal 115b is at its most negative potential. A capacitor 134 is connected between terminal 115b and the reference bus R to minimize the possibility that transistor 130 might be turned off in response to negative-going extraneous transients appearing at terminal 115b upon the occurrence of an external phase fault in the electric power system beyond the reach of the mho relay MT.

The intervals or time blocks of inactivation of the transistor 130 coincide to the intervals during which the operating quantity $\overline{IZ}-\overline{V}$ is positive, for it is only then that terminal 115b will be negative with respect to the reference bus R. If a gating pulse is generated across resistor 127 during such a block of inactivation, the potential level of the lead 7a is able to rise momentarily in a positive sense with respect to the reference bus, and energizing current can flow into the succeeding circuits being supplied by this lead while the capacitor 128 quickly charges. This energizing current comprises the output signal of the block-spike component 7 which is shown in FIG. 7, and the circuits supplied by the lead 7a are preferably designed for very sensitive response thereto.

While I have shown and described a preferred form of my invention by way of illustration, various modifications will occur to those skilled in the art. I contemplate therefore by the claims which conclude this specification to cover all such modifications as fall within the true spirit and scope of my invention.

What I claim as new and desire to secure by Letters Patent of the United States is:

1. A directional-comparison protective relaying system for initiating a predetermined control function in response to the occurrence of a fault on an A.-C. electric power transmission line having distantly spaced terminals at each of which are located signal transmitting and receiving means so arranged that the transmitting means at each terminal can communicate with the receiving means at any of said terminals remote therefrom, comprising at each of the line terminals:

(a) a first distance relay of a predetermined construction adapted to be connected to the local signal transmitting means for activating said transmitting means when in operation;

(b) directional sensing means adapted to be coupled to the line for operation only in response to the occurrence of an electric power line fault on the protected-line side of the local terminal;

(c) a second distance relay of said predetermined construction;

(d) means connected to the first and second distance relays and adapted to be coupled to the line for applying to said first relay electric quantities derived from line current and voltage and for applying to said second relay similarly derived electric quantities, the line-voltage derived quantities which are applied to said relays being representative of line voltage combined vectorially with voltages related to line current by predetermined first and second constant impedances, respectively, the vector sum of the predetermined first impedance at the local terminal and the predetermined second impedance at a remote terminal being approximately equal to the impedance of the protected line extending between said terminals;

(e) said first and second relays being so arranged that each operates whenever the relationship between the electric quantities being applied thereto indicates that an electric power fault has occurred on the protected line or nearby, the ohmic reach of the first relay being greater than that of the second relay and said first relay operation being effected in advance of said second relay operation; and (f) control means connected to said directional sensing means and to said second relay and adapted to be connected to the local signal transmitting and receiving means, said control means being responsive to the contemporaneous operations of said directional sensing means and said second relay for deactivating said transmitting means and, unless said receiving means is receiving a signal from an active remote transmitting means, for effecting initiation of the predetermined control function.

2. A directional-comparison protective relaying system for initiating a predetermined control function in response to the occurrence of a fault on a section of an A.C. electric power system, the protected section having two distantly spaced terminals at each of which are located signal transmitting and receiving means so arranged that the transmitting means at each terminal can communicate with the receiving means at the opposite terminal, comprising at each terminal:

(a) a first distance relay of a predetermined construction adapted to be connected to the local transmitting means for activating said transmitting means when in operation;

(b) directional sensing means adapted to be coupled to the electric power system for operation only in response to the occurrence of a fault in the power system on the protected-section side of the local terminal;

(c) a second distance relay of said predetermined construction;

(d) means connected to the first and second distance relays and adapted to be coupled to the electric power system for supplying both relays with similar electric quantities derived from the power system, said electric quantities comprising
    (i) a first quantity representative of system current at the local terminal and
    (ii) a second quantity representative of the vectorial combination of system voltage at the local terminal and a compensating voltage related to said current by a predetermined constant impedance which is approximately equal to the vector difference between the impedance of said protected section and the predetermined constant impedance which, at the opposite terminal, relates compensating voltage to system current, and said relays being so arranged that each operates whenever the relationship between the electric quantities being supplied thereto indicates that a phase fault has occurred in the power system on or near the protected section, said first relay, relative to said second relay, having a greater reach and a shorter operating time;

(e) first control means connected to said directional sensing means and to said second relay and responsive to their contemporaneous operations for effecting initiation of the predetermined control function, said first control means additionally being adapted to be connected to the local receiving means which, when receiving a signal from an active remote transmitting means, renders said control means ineffective to initiate said control function; and (f) second control means adapted to be connected to said transmitting means and connected to said directional sensing means and to said second relay for deactivating the transmitting means in response to the contemporaneous operations of the sensing means and the second relay.

3. The directional-comparison protective relaying system of claim 2 in which the predetermined constant impedance at each terminal of the protected section of the electric power system is equal to substantially one-half the impedance of said protected section.

4. A directional-comparison protective relaying system for initiating a predetermined control function in response to the occurrence of a fault on an A.C. electric power transmission line having distantly spaced terminals at each of which are located signal transmitting and receiving means so arranged that the transmitting means at each terminal can communicate with the receiving means at any of said terminals remote therefrom, comprising at each of the line terminals:

(a) a first impedance type distance relay adapted to be connected to the local transmitting means for activating said transmitting means when in operation;

(b) a mho type distance relay adapted to be coupled to the line for operation in response to the occurrence of an electric power line fault within its reach;

(c) a second impedance type distance relay;

(d) means connected to the first and second impedance type distance relays and adapted to be coupled to the line for supplying each impedance relay with
    (i) an operating quantity representative of line current and
    (ii) a restraining quantity representative of the vectorial combination of line voltage and a voltage related to line current by a predetermined constant impedance, the predetermined constant impedances at the respective terminals of the protected line being so interrelated that the operating characteristic of the first impedance relay at any one terminal and the operating characteristic of the second impedance relay at an opposite terminal have substantially coinciding centers, with the former relay being arranged to have greater ohmic reach and shorter operating time than the latter;

(e) first control means connected to said mho relay and to said second impedance relay and responsive to their contemporaneous operations for initiating the predetermined control function;

(f) means adapted to connect the local receiving means to the first control means for disabling said control means, thereby preventing initiation of said control function, whenever an active remote transmitting means is communicating with said receiving means; and (g) second control means adapted to connect both the mho relay and the second impedance relay to the local transmitting means for deactivating said transmitting means in response to the contemporaneous operations of the mho relay and the second impedance relay.

5. A directional-comparison protective relaying system for initiating a predetermined control function in response to the occurrence of a fault on a section of a polyphase A.C. electric power system, the protected section having distantly spaced terminals at each of which are located signal transmitting and receiving means so arranged that the transmitting means at each terminal can communicate with the receiving means at any of said terminals remote therefrom, comprising at each of said terminals:

(a) a first distance relay adapted to be connected to the local transmitting means for activating said transmitting means when in operation;

(b) directional sensing means adapted to be coupled to the electric power system for operation only in response to a fault in the power system occurring on the protected-section side of the local terminal;

(c) a second distance relay of the same kind as said first distance relay;

(d) means connected to the first and second distance relays and adapted to be coupled to the electric power system for supplying both relays with similar electric quantities derived from the power system, said electric quantities comprising
    (i) a first quantity representative of current flowing in the protected section of the power system at the local terminal thereof and
    (ii) a second quantity representative of the vectorial combination of power system voltage at the local terminal and a compensating voltage related to said current by a predetermined constant impedance, the predetermined constant impedances at distant terminals of the protected section of the power system being so selected that the second quantities supplied to said relays at the respective terminals are approximately alike so long as said protected section is sound;

(e) said first and second distance relays at each terminal being so arranged that each operates whenever the relationship between the first and second quantities being supplied thereto indicates that a fault has occurred in the power system on or near the protected section thereof, the ohmic reach of the first relay at the local terminal being greater than that of the second relay at any of said terminals remote therefrom and operation of the former relay being effected in advance of operation of the latter;

(f) first control means connected to said directional sensing means and to said second distance relay and responsive to their contemporaneous operations for initiating the predetermined control function;

(g) means adapted to connect the local receiving means to said first control means for disabling said control means, thereby preventing initiation of said control function, whenever an active remote transmitting means is communicating with said receiving means; and (h) second control means adapted to connect both the directional sensing means and the second distance relay to the local transmitting means for deactivating said transmitting means in response to the contemporaneous operations of the directional sensing means and the second distance relay.

6. The protective relaying system of claim 5 in which each of said first and second distance relays at each terminal of the protected section of the power system includes: means responsive to the first electric quantity supplied to the relay for providing a unipolarity operating voltage dependent thereon; means responsive to the second electric quantity supplied to the same relay for providing a unipolarity restraining voltage dependent thereon; and electroresponsive means energized by said operating and restraining voltages, the electroresponsive means being constructed and arranged to operate whenever the magnitudes of said first and second quantities are so related that the operating voltage magnitude exceeds the restraining voltage magnitude by at least a predetermined amount.

7. The relaying system of claim 6 in which the first distance relay at each terminal and the second distance relay at any remote terminal are so arranged that the magnitude of the unipolarity restraining voltage in the former is less than the magnitude of the unipolarity restraining voltage in the latter, so long as the protected section of the power system is sound.

8. A directional-comparison protective relaying system for initiating a predetermined control function in response to the occurrence of a fault on an A.C. electric power transmission line having distantly-spaced terminals at each of which are located signal transmitting and receiving means so arranged that the transmitting means at each terminal can communicate with the receiving means at any of said terminals remote therefrom, comprising at each of the line terminals:

(a) a first impedance relay adapted to be connected to the local transmitting means for activating said transmitting means when in operation;

(b) a mho relay adapted to be coupled to the line for producing an output signal in response to the occurrence of an electric power line fault within its reach;

(c) a second impedance relay for producing a supervising signal when in operation;

(d) first means connected to both of said impedance relays and adapted to be coupled to the line for supplying each impedance relay with an operating voltage representative of line current;

(e) second means connected to both of said impedance relays and adapted to be coupled to the line for supplying each impedance relay with a restraining voltage representative of the vectorial combination of line voltage and a compensating voltage related to line current by a predetermined constant impedance, the predetermined constant impedances at the respective terminals of the protected line being so interrelated that the operating characteristic of the first impedance relay at any one terminal and the operating characteristic of the second impedance relay at every terminal remote therefrom have substantially coinciding centers, with the former relay being arranged to have greater ohmic reach and shorter operating time than the latter;

(f) first control means connected to said mho relay and to said second impedance relay for energization by said output signal and said supervising signal, respectively, the first control means being responsive to contemporaneous energization by both output and supervising signals for producing an operating signal;

(g) second control means adapted to be coupled to the local receiving means and connected to said first control means for energization by said operating signal, said second control means being responsive to the presence of said operating signal for initiating the predetermined control function unless an active remote transmitting means is communicating with said receiving means; and (h) third control means connected to said first control means and adapted to be connected to the local transmitting means for deactivating said transmitting means in response to the production of said operating signal.

9. The protective relaying system of claim 8 in which said second means includes at least one transactor for obtaining the compensating voltage referred to, said predetermined constant impedance being dependent upon the transfer impedance of said transactor.

References Cited by the Examiner
UNITED STATES PATENTS
2,879,453  3/1959  Hodges et al. _____ 317—28

References Cited by the Applicant
UNITED STATES PATENTS
2,834,921  5/1958  McConnell.

MILTON O. HIRSHFIELD, *Primary Examiner.*

LEE T. HIX, *Examiner.*

J. D. TRAMMELL, *Assistant Examiner.*